US008687813B2

(12) United States Patent
Bar-El

(10) Patent No.: US 8,687,813 B2
(45) Date of Patent: Apr. 1, 2014

(54) METHODS CIRCUITS DEVICES AND SYSTEMS FOR PROVISIONING OF CRYPTOGRAPHIC DATA TO ONE OR MORE ELECTRONIC DEVICES

(75) Inventor: Hagai Bar-El, Rehovot (IL)

(73) Assignee: Discretix Technologies Ltd., Kfar Netter (IL)

( * ) Notice: Subject to any disclaimer, the term of this patent is extended or adjusted under 35 U.S.C. 154(b) by 297 days.

(21) Appl. No.: 12/947,381

(22) Filed: Dec. 9, 2010

(65) Prior Publication Data

US 2011/0116635 A1 May 19, 2011

Related U.S. Application Data

(60) Provisional application No. 61/272,890, filed on Nov. 16, 2009.

(51) Int. Cl.
*H04L 29/06* (2006.01)

(52) U.S. Cl.
USPC .................................... 380/280; 380/45

(58) Field of Classification Search
USPC ................. 380/278, 279, 280, 44, 45
See application file for complete search history.

(56) References Cited

U.S. PATENT DOCUMENTS

| 6,937,726 | B1 * | 8/2005 | Wang | 380/30 |
| 7,213,005 | B2 * | 5/2007 | Mourad et | 705/64 |
| 7,380,120 | B1 * | 5/2008 | Garcia | 713/160 |
| 7,516,321 | B2 * | 4/2009 | Chen et al. | 713/155 |
| 7,660,421 | B2 * | 2/2010 | Hopkins et al. | 380/277 |
| 7,774,279 | B2 * | 8/2010 | Wang et al. | 705/51 |
| 7,779,258 | B2 * | 8/2010 | Arnold et al. | 713/169 |
| 7,779,455 | B2 * | 8/2010 | Abellan Sevilla | 726/6 |
| 7,873,168 | B2 * | 1/2011 | Tateoka et al. | 380/282 |
| 7,908,474 | B2 * | 3/2011 | Arnold et al. | 713/155 |
| 7,920,706 | B2 * | 4/2011 | Asokan et al. | 380/277 |
| 8,098,827 | B2 * | 1/2012 | Okaue | 380/278 |
| 8,145,900 | B2 * | 3/2012 | Launchbury et al. | 713/162 |
| 8,332,633 | B2 * | 12/2012 | Raike | 713/160 |
| RE43,906 | E * | 1/2013 | Garcia | 713/165 |

(Continued)

OTHER PUBLICATIONS

Abdalla, M.; Kiltz, E.; Neven, G.; "Generalised key delegation for hierarchical identity-based encryption", Information Security, IET, vol. 2, Issue 3, Sep. 2008, pp. 67-78.*

(Continued)

*Primary Examiner* — Victor Lesniewski
(74) *Attorney, Agent, or Firm* — Eitan, Mehulal & Sadot

(57) ABSTRACT

Disclosed are methods, circuit, devices and systems for provisioning cryptographic material to a target device. According to embodiments, a cryptographic material provisioning (CMP) module may be adapted to process a provisioning message with a first message portion which is encrypted with a native key of the target device and which includes first cryptographic material along with a first permissions data vector, wherein the CMP may be further adapted to process data bits of a second portion of the provisioning message using the first cryptographic material and in accordance with usage limitations defined in the first permissions data vector.

19 Claims, 5 Drawing Sheets

(56) References Cited

U.S. PATENT DOCUMENTS

| | | | |
|---|---|---|---|
| 8,396,222 B2* | 3/2013 | Solow et al. | 380/279 |
| 8,437,476 B2* | 5/2013 | Agagliate et al. | 380/278 |
| 2002/0025045 A1* | 2/2002 | Raike | 380/280 |
| 2002/0031222 A1* | 3/2002 | Buchheit et al. | 380/201 |
| 2003/0016829 A1* | 1/2003 | Chu | 380/281 |
| 2003/0172280 A1* | 9/2003 | Scheidt et al. | 713/182 |
| 2004/0255130 A1 | 12/2004 | Henry et al. | |
| 2005/0149924 A1 | 7/2005 | Komarla et al. | |
| 2006/0053285 A1* | 3/2006 | Kimmel et al. | 713/166 |
| 2007/0248232 A1* | 10/2007 | Driscoll et al. | 380/280 |
| 2008/0123863 A1* | 5/2008 | Bade et al. | 380/282 |
| 2008/0263370 A1* | 10/2008 | Hammoutene et al. | 713/193 |
| 2009/0136028 A1 | 5/2009 | Card, II | |
| 2009/0268902 A1* | 10/2009 | Fascenda et al. | 380/44 |

OTHER PUBLICATIONS

Fu, Jianqing; Chen, Jian; Fan, Rong; Chen, XiaoPing; Ping, Lingdi; "An efficient delegation-based anonymous authentication protocol", Second International Workshop on Computer Science and Engineering, Oct. 28-30, 2009, pp. 558-562.*

Chang, Chin-Chen; Lin, Chu-Hsing; Lee, Wei; Hwang, Pai-Cheng; "Secret Sharing with Access Structures in a Hierarchy", 18th International Conference on Advanced Information Networking and Applications, Mar. 29-31, 2004, vol. 2, pp. 31-34.*

International Search Report for application PCT/IB2010/055198 dated Jun. 10, 2011.

* cited by examiner

US 8,687,813 B2

METHODS CIRCUITS DEVICES AND SYSTEMS FOR PROVISIONING OF CRYPTOGRAPHIC DATA TO ONE OR MORE ELECTRONIC DEVICES

The present application claims priority from U.S. Prov. Application No. 61/272,890, filed on Nov. 16, 2009 and incorporated herein by reference in its entirety.

FIELD OF THE INVENTION

The present invention relates generally to the field of data security. More specifically, the present invention relates to methods, circuits, devices and systems for provisioning of cryptographic data to one or more electronic devices.

BACKGROUND

Key Provisioning is a common problem to almost all cryptographic modules. Whenever a cryptographic device is designed to carry out operations using internally-stored key material, this key material needs to be available to the device.

For most key material, provisioning is done by means defined at the application level. Most applications support methods to securely communicate keys to the participants of their security protocols. Provisioning methods specified by applications usually rely on pre-existing key material, which is used to secure the subsequent provisioning process. Other applications carry out provisioning without pre-existing key material, if their threat models allow that.

Key Provisioning remains an open problem for initial key material that is inserted into devices. Such a provisioning process cannot rely on pre-existing key material, because there is none. It is also often too sensitive to rely on unencrypted key delivery, even if the device is assumed to still be within secure premises.

Moreover, it is often the case that the entity that happens to install the key material in a device (hereafter referred to as Installer), while operating on behalf of the owner of the device asset (hereafter referred to as Owner), is not entirely trusted by Owner. The provisioning process, if carried out without measures against compromise by Installer, requires extremely high levels of trust on behalf of Owner. In many cases, such trust cannot be granted, leading to the need to devise a system that protects the provisioning process against compromise also by Installer.

Another source for complexity stems from the existence of Sub-owners. A Sub-owner is an entity which is not the owner of the device asset, but which owns some of the key material to be placed in it. Each Sub-owner has its own Installer (one or more). The same trust issue between the Owner and its Installer for each Sub-owner or any of its respective Installers. Another situation partial distrust occurs between the Owner or its Sub-owners. The Owner of the Sub-owner provide its devices with key material, but may not trust it to overwrite other key material, such as that installed by Owner or by any other Sub-owner. In most cases, Owner will not accept the ability of one of its Sub-owners to obtain key material provisioned by another Sub-owner.

The problem of key provisioning can thus be stated as the need to: (1) allow Owner allow Installer (one or more) to provide the device with key material on behalf of the Owner, without exposing the key material to the Installer performs the physical provisioning operation;
  allow a similar model for more than one Sub-owner, each having associated with it one or more Installers;
  prevent any Owner from obtaining key material provisioned by another Sub-owner; and
  allow Owner to control what key material each Sub-ownerprovision through its Installers, while not having possession of the key material itself.

The client-side of the implemented solution for the problem above shall fit within the capabilities of an embedded chip-set, and shall be made to be carried out in short times, e.g., during fabrication.

SUMMARY OF THE INVENTION

The present invention includes methods, circuits, devices and systems for provisioning of cryptographic material, such as cryptographic keys, or data to one or more electronic devices. According to embodiments, a provisioning message preamble for a specific target device and/or for a specific group of devices (e.g. specific make and model of cell-phones) may be generated and provided to a party intending to install or otherwise use a functional cryptographic key (i.e. cryptographic material) on the target device. The provisioning message preamble, operating in concert with a Cryptographic Material Provisioning Module (CMP) on the target device, may provide for: (1) a multilevel delegation hierarchy/structure for provisioning cryptographic keys to the target device, such that the native (root) key owner of the device (the part with the highest level unrestricted rights) may delegate complete or partial key provisioning rights to one or more other parties, and some or all of the other parties may further delegate some or all of their respective rights to other parties along a hierarchical chain whose length and/or count has no predefined limit, (2) partial delegation functionality (e.g. based on key types) such that any member in a provisioning rights delegation hierarchy may define which key provisioning rights its delegate or delegates receive, including the right to further delegate or not, as long as those rights do not exceed the rights of the delegating party.

The provisioning message preamble may be constructed of one or more message portions or segments, and the first portion or segment may be encrypted and/or signed using the target device's native/root key. The first portion of the preamble may include first cryptographic material (e.g. a first cryptographic key, link/pointer to location of a key, etc.) and a permissions data vector, which vector may include one or more usage restrictions including: (1) what type of keys may be provisioned to the target device by the user of the preamble (e.g. first delegate), and (2) an indication of whether the user of the preamble may convey key provisioning rights or sub-rights further down a rights delegation hierarchy or chain.

According to further embodiments, the provisioning message preamble (i.e. first portion of the provisioning message) may be configured such that a second provisioning message portion, including cryptographic material (e.g. functional key or keys which are the subject of provisioning), may be appended to the preamble (e.g. by the first delegate) to generate a complete first provisioning message. The second portion of the provisioning message may be encrypted and/or signed by the first cryptographic material (e.g. a first cryptographic key provided by or otherwise known by the first delegate) within the preamble. According to embodiments, a CPM on a target device receiving the complete provisioning message may process the preamble by: (1) decrypting the preamble using the devices native/root key, (2) extracting from the preamble the first cryptographic material and the permissions data vector, (3) decrypting the second portion of the message using the extracted first cryptographic material, (4) extracting a functional key or keys (second cryptographic material) within the second portion, (5) checking the extracted functional key or keys (second cryptographic material) against usage permissions defined in the permissions data vector within the preamble to determine whether the extracted key or keys are of a type permitted for provisioning by the permissions data vector, and (6) provisioning the keys to the target device (installing, storing or otherwise using) if the extracted key type(s) are permitted.

According to further embodiments, the second provisioning message portion may include second cryptographic material which is not a functional key (i.e. a key which is the subject of provisioning to the target device), but rather cryptographic data (e.g. key, link to key, etc.) for decrypting and/or authenticating a third portion (e.g. provided by a second delegate) of the provisioning message, which third portion may be appended (e.g. by the second key provisioning delegate) behind the second portion. According to this embodiment, the second portion may also include a second permissions data vector indicating usage limitations of any cryptographic material (e.g. third cryptographic material/key/etc.) to be extracted from the third message portion. In this event, when the third portion includes a functional key, the combined first and second portions may collectively be considered the provisioning message preamble, and the third message portion including the functional key (e.g. provisioned by the second delegate) to be the subject of provisioning on the target device may be considered the message body. According to embodiments where the first portion of the preamble is appended by a second portion which also includes cryptographic material and/or a second permissions data vector, the combined cryptographic material and permission data vectors of the first and second portions may be termed a "delegation structure", which delegation structure provides the means (cryptographic material for decrypting) and defines allowable usage (types of keys allowed for provisioning on the target device) for one or more functional cryptographic keys to be provisioned by the second delegate to the target device.

Likewise, a third provisioning message portion may be added by a second delegate with cryptographic material (e.g. key, link to a key, etc.) required for decrypting and/or authenticating a fourth portion of the provisioning message, which fourth portion may be appended (e.g. by a third delegate) behind the third portion. If the fourth portion includes a functional key, the first through third portions of the message may be considered the preamble including the delegation structure required to access and process the functional key of the fourth portion.

It should be understood that such a chain of provisioning message portions, where cryptographic material in one portion may be used to decrypt/authenticate and extract data from the next, has no inherent limitation in count. By providing for portions of a provisioning message to be appended to one another according to the methodology described, a length or size of a provisioning rights delegation chain or hierarchy (i.e. delegation structure) may be indefinite, with each provisioning rights delegate being able to provide sub-rights to a sub-delegate, as long as none of the delegated rights exceed or contradict any usage restrictions (e.g. which types of keys may be installed) found in any of the permissions data vectors of any preceding message portions.

Since data processing at the target device of a provisioning message according to embodiments of the present invention is substantially sequential, according to some embodiments the data processing and/or data processor (e.g. CPM) may be a state-machine. Since data processing at the target device of a provisioning message according to embodiments of the present invention is substantially sequential, according to some embodiments the data processing and/or data processor (e.g. CPM) may not require access to memory for storage of cryptographic material within the provisioning message.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
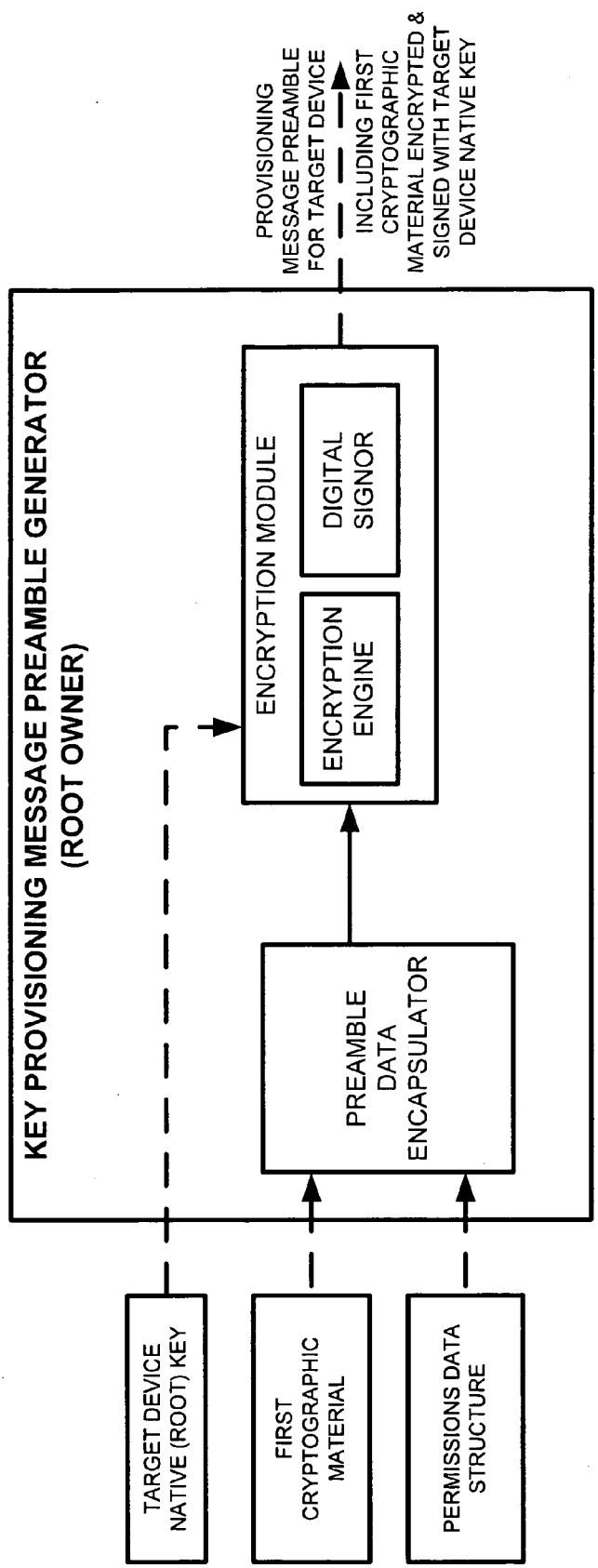
FIG. 1 is a functional block diagram of a provisioning message preamble generator used by a target device root owner according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The following definitions and examples may apply to some embodiments of the present invention:

Root Keys

A Root Key, R, may be the one key in each device that is used as the root trust anchor. This is the first key that may be used when decrypting and authenticating a Provisioning Message. It is the only key material that is assumed to pre-exist in all provisioned devices. It can be facilitated by the means described below. The Root Key can either be a single key used in an entire lot of devices, or it can be device-specific. Having the Root Key be device specific increases security, but is difficult to manage and is sometimes also technically infeasible.

The Root Key stored by the device can be made available to the provisioning process requiring it in one of three ways:

it can be recalled from Internal Protected Storage, such as EEPROM, or other non-volatile memory, where it was stored as part of the root key provisioning process detailed in Section root-provisioning;

it can be made available as a hard-coded part of the logic facilitating Discretix Key Provisioning System; or it can be derived from one or more Root Key Components, $R_1, \ldots, R_n$, by the derivation procedure detailed in Section root-derivation.

The length of the Root Key field (and the key itself) may be 128 bits, unless required otherwise. It may be accessible by components other than a Key Provisioning System and other than the internal logic utilizing it, e.g., for protection of other keys. Other components using the value of Root Key to derive other keys (e.g., secure storage keys), may assure that they do not re-use KDF parameters used by the Key Provisioning System, as further detailed below.

Functional Keys & Key Structure

Functional keys may be the subject of provisioning. These are the pieces of information (cryptographic material) that are delivered to the device as part of the provisioning process, and which are consumed on the device by other processes after the provisioning process concludes. A Functional Key, denoted herein as k, is not necessarily a cryptographic key. This "key" is essentially an opaque field which may never be interpreted by the Key Provisioning System. Therefore, it can be a wrapper for any data within reasonable length requirements. Each Functional Key may be a field of a larger structure—the Key Structure. The Key Structure may be the object maintained by the Key Provisioning System which may store the Functional Key and associated metadata.

The data which consists of the Key Structure may include:

KEY VALUE Said Functional Key, k

KEY ID An identifier of the key or structure, which is typically unique

KEY TYPE A string representing the Key Type of k

KEY SLOT A string representing the Key Slot of k, within the Key Type

The KEY TYPE and KEY SLOT fields may be defined as:

Key Types

Each Functional Key that is processed (that is, received and stored) by the Key Provisioning System, is associated with a Key Type. This type may be a non-unique string representing the usage, purpose, or application of the key. This property may be provided to Owner its Sub-owners as a tool to control delegation. Nevertheless, the Key Type may also be used as part of the key metadata which is read by the application that uses the key, e.g., to determine the usage of the key, or to allow an application to detect its own keys in a repository that contains keys of several applications.

The namespace of a Key Type field may be maintained by an Owner and possibly its one or more Sub-owners. From the technical perspective of the Key Provisioning System, the value of Key Type is a string, which may be processed only by functions of sub-string concatenation and comparison.

As an example for the possible uses of the Key Type field, an Owner (and possibly its one or more Sub-owners) may decide to use the following values for Key Type fields:

SYSTEM/FIRMWAREUPDATE/VERIFICATION

SYSTEM/ANTITHEFT/ATTESTATION

APPS/PAYMENTAPP/ENCRYPT

APPS/PAYMENTAPP/SIGN

APPS/DRM/PLAYREADY/GROUPPRIVATE

APPS/DRM/PLAYREADY/SERVERPARAMETERS

Key Slots

Key Slot is a field which may be provided for distinguishing between keys that have the same Key Type. When more than one key of a given Key Type is provisioned by a Key Provisioning System, each of those keys may have a different Key Slot value in its Key Slot field. The Key Slot values may repeat among keys of different Key Types. The value in a Key Slot can be an integer counter. From the perspective of the Key Provisioning System, however, it may be a short string which may contain any value and which may be treated as an opaque value which may be used for comparison purposes.

The combination of values in the Key Type and Key Slot fields may be unique on a target device. However, there may be no requirement for the Key ID field to be unique. It is likely to be unique due to its nature and name, but its uniqueness is not a requirement of the Key Provisioning System. For the Key Provisioning System, the value in Key ID may be an opaque string which is stored so it can be used by client applications.

Provisioning Structures & Provisioning Messages

The Provisioning Structure may be the data object that is sent in the Provisioning Message, where a single Provisioning Message may contain one or more instances of a Provisioning Structure. The client-side of the Key Provisioning System may accept a Provisioning Message from an Installer, and may act based on each Provisioning Structure the message may contain.

Each Provisioning Structure may contain, or may refer to, a single Functional Key that may be processed by the Key Provisioning System. The Provisioning Structure object may consists of two parts: a Preamble and a Body. The Preamble may contain zero or more instances of a Delegation Structure, and the Body may contain the actual command and data necessary for a key provisioning operation. The Provisioning Structure can be seen as consisting of zero or more instances of Delegation Structures, followed by a Body structure, as detailed in the following:

Delegation Structure Object

The Delegation Structure is an object that is designed to communicate from an Owner or a Sub-owner the Key Provisioning System on the device, its approval to have a target Sub-owner issue the command which appears in the Body object of that Provisioning Structure. The target Sub-owner is not identified in the structure, because there is no naming convention and enforcement for Sub-owners. Rather, the target Sub-owner is referenced by a key it possesses, as detailed below.

Delegation Chain

The key that the target Sub-owner uses is denoted as $P_i$, with i being an indicator of the position of that Delegation Structure object in the series of such structures in the Provisioning Structure. For example, $P_1$ is the key that is held by the Sub-owner who was delegated with authority to provision keys by Owner, who is holding on to R; $P_2$ is the key that is held by the Sub-owner who was delegated with authority to provision keys by the Sub-owner that holds $P_1$ above, and so forth.

The Preamble structure of the Provisioning Structure object may contain an ordered set of Delegation Structure objects, introducing $P_1$, $P_n$ in order. While a limit on n may be specified, the design is made such that it allows n to be arbitrarily large, e.g., by not linking its value to required system resources other than processing time. For example, a Provisioning Structure causing the insertion of a certain key may start with a Delegation Structure from Owner (holding R) to a Sub-owner$P_1$, allowing it to provision the key, followed by a Delegation Structure created by the Sub-owner$P_1$ to another Sub-owner holding on to $P_2$, allowing this one to provision that key, followed by the actual key insertion command authorized by the Sub-owner$P_2$.

Restricting Delegation by Key Types

Each delegation may be bound to a group of allowed Key Types. Such groups may be described using a Key Type Prefix (Permissions Data Vector). A delegation may apply to one such prefix. Delegation issued for a Key Type Prefix "a" may imply that the target Sub-owner of the delegation controls only the part of the Key Type namespace starting with "a". The owner of R, who is Owner, may control the entire namespace of Key Type.

Each Sub-owner may be able to only delegate with a Key Type Prefix that is a continuation of the Key Type Prefix by which it was itself delegated. For example, a Sub-owner holding on to $P_2$ and who was delegated (by the Sub-owner $P_1$) with the Key Type Prefix -Apps/DRM/PlayReady-, can only delegate to the Sub-owner holding on to $P_3$ based on prefixes such as -Apps/DRM/PlayReady/XYTelecom-, or even -Apps/DRM/PlayReady- itself, but not, for example, -Apps/MPayment-.

The Delegation Structure object may consists of the following fields:

Target Key—The 128-bit (or other) key that is held by the target Sub-owner. This field contains $P_i$ in an encrypted form, as detailed below.

Allowed Type Segment—The Key Type Prefix of the Key Types that are allowed to be processed by the Sub-owner$P_i$, as detailed below.

Delegation Auth—A MAC on the above fields, indicating the approval of the owner of $P_{i-1}$ to delegate the permission to operate on keys of the above Key Type Prefix, to the Sub-owner who is the owner of $P_i$.

The Target Key may contain $P_i$ in an encrypted form. Encryption may be done by AES ECB, with a key that derives from $P_{i-1}$ (or R, if i=1). The encryption key, $K_E$, may be computed in accordance to any known method including those described herein, with a CMAC PRF in accordance to any known methods, including those described below:

$$L = E(P_{i-1}, 0^b) \tag{1}$$

$$K_1 = \begin{cases} L << 1 & MSB_1(L) = 0 \\ (L << 1) \oplus 0^{120}10000111 & MSB_1(L) \neq 0 \end{cases} \tag{2}$$

$$T = E(P_{i-1}, K_1 \oplus (1^1 \| \text{PROVDENC} \| 0x00 \| 0^{47} \| 10^7)) \tag{3}$$

$$K_E = T \tag{4}$$

Notations in the above algorithm may be those used in [Error! Reference source not found.]. L may be an encrypted zero block using the effective key, $P_{i-1}$. $K_1$ may be a sub-key in accordance with any known method and those described herein. The method may be built so the encrypted block is exactly 128 bits, so that $K_2$ needs not be calculated at all. The tag T, which is the KDF output, may consist of ECB encryption of a "1" bit (indicating rolling block number), a unique constant Label used by this specification for encryption keys, a 47-bit zero string which serves formally as a Context (constant—to achieve key persistence), and informally to pad the structure, and a binary representation of 128, which may be the required key length.

The Target Key field may then be computed as the AES ECB encryption of $P_i$ with the encryption key deriving from $P_{()i-1}$, as follows:

$$\text{TargetKey} = E(K_E, P_i)$$

The value of Allowed Type Segment may be the Key Type Prefix that the Delegation Structure object applies to. The Allowed Type Segment may always appended in its entirety to the Allowed Key Type derived when processing the earlier Delegation Structure object in the chain, with the Delimiter following it. For example, if the preceding Delegation Structure object caused the current Allowed Type to be -System/Apps-, and the value in Allowed Type Segment is "DRM", then the resulting Allowed Type is -System/Apps/DRM-. The Delimiter, '/', is implicitly appended after every insertion of an Allowed Type Segment value. Notwithstanding, this symbol may be allowed as part of the Allowed Type Segment.

The value of Delegation Auth may be a CBC-MAC computed over $P_i$ and the Allowed Type Segment. The CBC-MAC may be computed using a key that derives from $P_{i-1}$ (or R, if i=1). The MAC key, $K_I$, may be computed in accordance with any known methods and those described herein with a CMAC PRF in accordance with:

$$L = E(P_{i-1}, 0^b) \tag{5}$$

$$K_1 = \begin{cases} L << 1 & MSB_1(L) = 0 \\ (L << 1) \oplus 0^{120}10000111 & MSB_1(L) \neq 0 \end{cases} \tag{6}$$

$$T = E(P_{i-1}, K_1 \oplus (1^1 \| \text{PROVDMAC} \| 0x00 \| 0^{47} \| 10^7)) \tag{7}$$

$$K_I = T \tag{8}$$

Notations in the above algorithm may be those used in [Error! Reference source not found.]. Reference is also made to earlier explanations about the parameters being used.

The value of Delegation Auth is computed in accordance with [2] as follows:

Delegation Auth=CMAC($K_I$;($P_i$∥Allowed Type Segment);128)

The Body Object

The Body object of the Provisioning Structure is what contains the provisioning payload. The payload is a command that carries out one of the following operations:
- ADD Adds a key
- DEL Deletes a key
- ENU Enumerates (i.e., lists) the keys already stored This BODY object may consist of six fields:
- COMMAND The command, represented by at least three bits, with five remaining combinations reserved for future use.
- KEY TYPE The Key Type of the key to be added or removed, or a null value, for the enumeration command.
- KEY SLOT The Key Slot of the key to be added or removed, or a null value, for the enumeration command.
- KEY VALUE The actual key to be added, or a null value for commands that are not 'ADD'. If not null, the contents of this field are encrypted.
- KEY ID The ID of the key to be added or removed, or a null value for the enumeration command.
- PAYLOAD AUTH A MAC on all the above fields.

The Key Value field may be the only field of which content is encrypted. Encryption may be done using AES CCM, or any other approved mode, with a key that derives from $P_i$ (or R, if there are no Delegation Structure objects in that Provisioning Structure). $P_i$ may be the key that was introduced by the last Delegation Structure object preceding the Body object. The encryption key, $K_E$, may be computed in accordance with any known method with a CMAC PRF in accordance with:

$$L = E(P_i, 0^b) \tag{9}$$

$$K_1 = \begin{cases} L << 1 & MSB_1(L) = 0 \\ (L << 1) \oplus 0^{120}10000111 & MSB_1(L) \neq 0 \end{cases} \tag{10}$$

$$T = E(P_i, K_1 \oplus (1^1 \| \text{PROVPENC} \| 0x00 \| 0^{47} \| 10^7)) \tag{11}$$

$$K_E = T \tag{12}$$

Notations in the above algorithm are those used in [Error! Reference source not found.], and as explained earlier in this document.

The Key Value field may then be computed as the AES CCM encryption of the key to be provisioned, k, with the encryption key deriving from $P_i$, as follows:

$$\text{KEYVALUE} = E(K_E, k)$$

The value of Payload Auth is a CBC-MAC computed over all other fields of the Body structure. The CBC-MAC may be computed using a key that derives from $P_i$ (or R, if i=1). The MAC key, $K_I$, is computed in accordance with known methods with a CMAC PRF in accordance with:

$$L = E(P_i, 0^b) \tag{13}$$

$$K_1 = \begin{cases} L << 1 & MSB_1(L) = 0 \\ (L << 1) \oplus 0^{120}10000111 & MSB_1(L) \neq 0 \end{cases} \tag{14}$$

$$T = E(P_i, K_1 \oplus (1^1 \| \text{PROVPMAC} \| 0x00 \| 0^{47} \| 10^7)) \tag{15}$$

$$K_I = T \tag{16}$$

Notations in the above algorithm are those used in [Error! Reference source not found.]. Refer also to earlier explanations about the parameters used.

The value of Payload Auth is computed as follows:

$$\text{Delegation Auth} = \text{CMAC}(K_I; (\text{Command} \| \text{Key Type} \| \text{Key Value} \| \text{Key ID}); 128)$$

Functions

The following functions may be performed by a Key Provisioning System according to embodiments.

Root Key Provisioning—Root key provisioning is the operation in which the value of R is entered into the device.

Single Value Insertion—Provided that there are no pre-existing secrets on the device which can be employed for secure provisioning of R, it can only be inserted into the device by means that allow only for its setting, never for its retrieval. Such means can be programmed as part of the Key Provisioning System, as long as the storage used to keep R is such that, while being run-time programmable, is not readable by logic which is not part of the Key Provisioning System.

In the case of a global R value, this value can be included as part of the RTL (Register Transfer Level) description provided to the chip manufacturer. Obfuscation techniques may be used to disguise the value of R so that it is not readily evident to whoever views the RTL description.

Two options for inserting the value of R are:
- using a write-only mechanism as part of Discretix Key Provisioning System, along with exclusive-access storage, and
- using a hard-coded value of R for a group of devices.

The value of R may be random, deriving from an approved PRNG that was fed by an approved (given the existence of one) RNG.

Multiple Shares Insertion—Instead of inserting a single R value, multiple Root Key Components may be inserted. Each Root Key Component value is inserted as if it was the single value of R, as detailed above. That is, each Root Key Component can be included in the RTL or received into the device (e.g., using a write-only mechanism). R will be computed from these components (a.k.a., "key shares") as a combination of them all, as detailed in Section Error! Reference source not found.

Owner may have knowledge of all Root Key Components, to be able to exercise its right as the root provisioning entity. However, it does not need to actually store all components. It is enough for Owner may compute the value of R that all components convey together and store this value.

The provision of the Root Key, R, as several Root Key Component values rather than as a single Root Key value has no implication on the perception of R as a root of trust for provisioning, and all operations using R have the same security model. The only implication of provisioning R as a set of components is on the trust it requires of the entities provisioning (or otherwise having access to) these components. In accordance with the Trivial Secret Sharing Scheme being used in the Key Provisioning System, when allowing each one of n entities to provision a single Root Key Component each, none of these entities can determine R with better than pure guessing probability on the entire key space or R. This assertion also applies to any group of i colluding entities, just as long as kn.

The value of each Root Key Component $R_i$ shall be random, deriving from an approved PRNG that was fed by an approved (given the existence of one) RNG. No waivers or exemptions apply in spite of the fact this single value cannot itself recover, or assist the recovery of, the Root Key.

Root Key Derivation—If the value of the Root Key was provided as a single Root Key value, then its derivation is trivial; it is simply read.

If the value of R was not provisioned explicitly, but is a combination of n Root Key Component values, then the n shares are retrieved as $R_1 \ldots R_n$, and the value of R is computed as follows:

$$R = R_1 \oplus R_2 \oplus \ldots \oplus R_n$$

No other use may be made of any of the $R_1 \ldots R_n$ values, unless explicitly specified and approved.

Functional Key Provisioning—Functional key provisioning is the process in which a Functional Key is inserted into the device. The entity that provisions a Functional Key of a particular Key Type is either Owner, or a Sub-owner who was delegated with authority to provision keys of that Key Type. Authority could have been delegated either from Owner or from another Sub-owner who is itself authorized to provision keys of the same Key Type, or of a more general Key Type Prefix. This section assumes that delegation has already been carried out, as specified in Section delegation.

To insert a Functional Key k of Key Type t, into the device, the following steps shall be taken:

1. The provisioning entity carries out the following operations, in the order specified:
   (a) If the provisioning entity is a Sub-owner, then it finds a proper chain of DELEGATION STRUCTURE objects, allowing it to provision a key of type t. If the entity was delegated by Owner, then such a chain is likely to have one DELEGATION STRUCTURE element. If the entity was delegated by another Sub-owner, then the chain will include DELEGATION STRUCTURE objects chaining from Owner to the immediately delegating Sub-owner, along with a final DELEGATION STRUCTURE object delegating authority from that Sub-owner to the Sub-owner to provision the key. The chain is always provided to the provisioning entity in its entirety by the immediately delegating Owner/Sub-owner—it is never constructed by the provisioning entity. The selected chain shall be one in which all ALLOWED TYPE SEGMENT fields of the DELEGATION STRUCTURE objects, when concatenated with the DELIMITER added between them, and with a DELIMITER added at the end, form a prefix of t. For example, a chain of DELEGATION STRUCTURE objects with the following respective ALLOWED TYPE SEGMENT fields: -System-, -Apps/DRM-, and -PlayReady-, are suitable for provisioning a key where t=-System/Apps/DRM/PlayReady/GRPrKey-.
   (b) It creates a BODY element containing 'ADD' in the COMMAND field, and a KEY TYPE field, which holds the value of t, after cutting off the Key Type Prefix generated by the entire chain of DELEGATION STRUCTURE objects, if such exist. (By the above example, the KEY TYPE field will contain -GRPrKey-.)
   (c) It uses its key, P, to compute both encryption and integrity keys: $K_E$ and $K_I$, respectively. If the provisioning entity is Owner, then P=R. Computation of these keys shall be done as specified in Section body.
   (d) It encrypts k with $K_E$ using AES CCM.
   (e) It appends $E(K_E,k)$, the value of KEY ID, t (as the KEY TYPE), and a KEY SLOT value, to the BODY structure.
   (f) It computes a MAC, in accordance with [Error! Reference source not found.], using $K_I$ as the key, on the entire BODY structure.
   (g) It forms a PROVISIONING STRUCTURE from both the chain of DELEGATION STRUCTURE objects and the BODY structure. The resulting PROVISIONING STRUCTURE forms the Provisioning Message.
   (h) It may append to the Provisioning Message additional PROVISIONING STRUCTURE objects in a similar manner. As an implementation decision, it may be permissible to append several BODY structures to the same PREAMBLE, if they all suit the same Key Type Prefix (chain Of DELEGATION STRUCTURE objects).
   (i) It communicates the Provisioning Message to the Key Provisioning System on the device.

2. The client of the Key Provisioning System on the device receives the Provisioning Message, and performs the following operations:

3. It sets: $C \leftarrow R$, $A \leftarrow \emptyset$

4. It follows the chain of DELEGATION STRUCTURE objects in the Preamble; for each such structure carrying out the following actions:
   (a) Parse the DELEGATION STRUCTURE object: the ALLOWED TYPE SEGMENT into a, the TARGET KEY into t, and DELEGATION AUTH into m.
   (b) Compute $K_I$ using C and the routine specified in Section delegation-format.
   (c) Compute a MAC in accordance with [Error! Reference source not found.], on the DELEGATION STRUCTURE object.
   (d) Compare the computed MAC with m. Terminate the process immediately if MAC values do not match. Indication may include the value of m where failure occurred.
   (e) Compute $K_E$ using C and the routine specified in Section delegation-format.
   (f) Set: $C \leftarrow D(K_E,t)$
   (g) Set: $A \leftarrow A\|a\|\text{DELIMITER}$ 5. It parses the BODY structure of the PROVISIONING STRUCTURE object: the COMMAND, the KEY TYPE into t, the KEY SLOT into s, the KEY VALUE into k, the KEY ID, and the Payload Auth into m. The value of COMMAND is ADD, by the use-case definition.

6. It computes $K_I$ using C and the routine specified in Section body.

7. It computes a MAC using $K_I$ and the fields of the BODY structure.

8. It compares the computed MAC with m. It terminates the process immediately if MAC values do not match. Indication may include the fact that MAC of the BODY structure failed.

9. It computes: $T \leftarrow A\|t$

10. It computes $K_E$ using C and the routine specified in Section body.

11. It computes $D(K_E,k)$ to obtain the key to be added.

12. It checks if a key is already stored with both the same Key Type t and the same Key Slot s. It reports a suitable error if one does, and terminates the process.

13. It files the decrypted key $D(K_E,k)$, along with the computed Key Type T, Key Slot s, and the value of KEY ID.

14. It reports success.

The actions carried out by the provisioning entity and the Key Provisioning System on the device may be interlaced, so not to require the Key Provisioning System to store large chunks of data, such as the chains of DELEGATION STRUCTURE objects. For example, structures can be sent to the Key Provisioning System one by one, with the Key Provisioning System merely retaining a state throughout the process.

Enumeration and Removal of Keys

The process for the removal of keys resembles the process for addition of keys, with the following exceptions:

No KEY VALUE is provided in the BODY structure.

The key with the proper KEY TYPE and KEY SLOT is removed, if it exists.

The process for the enumeration of keys resembles the process for addition of keys, with the following differences:

No KEY VALUE is provided in the BODY structure.

The response from the Key Provisioning System may consist of the all type of KEY TYPE, KEY SLOT, and KEY ID, for those keys for which the KEY TYPE field starts with the value of T as computed above. In other words, the keys listed will be the ones of which the KEY TYPE field starts with T, which is conveyed by the combination of the BODY structure and the chain of DELEGATION STRUCTURE objects that were provided.

The KEY TYPE field of the BODY structure may be empty.

Figure 2:
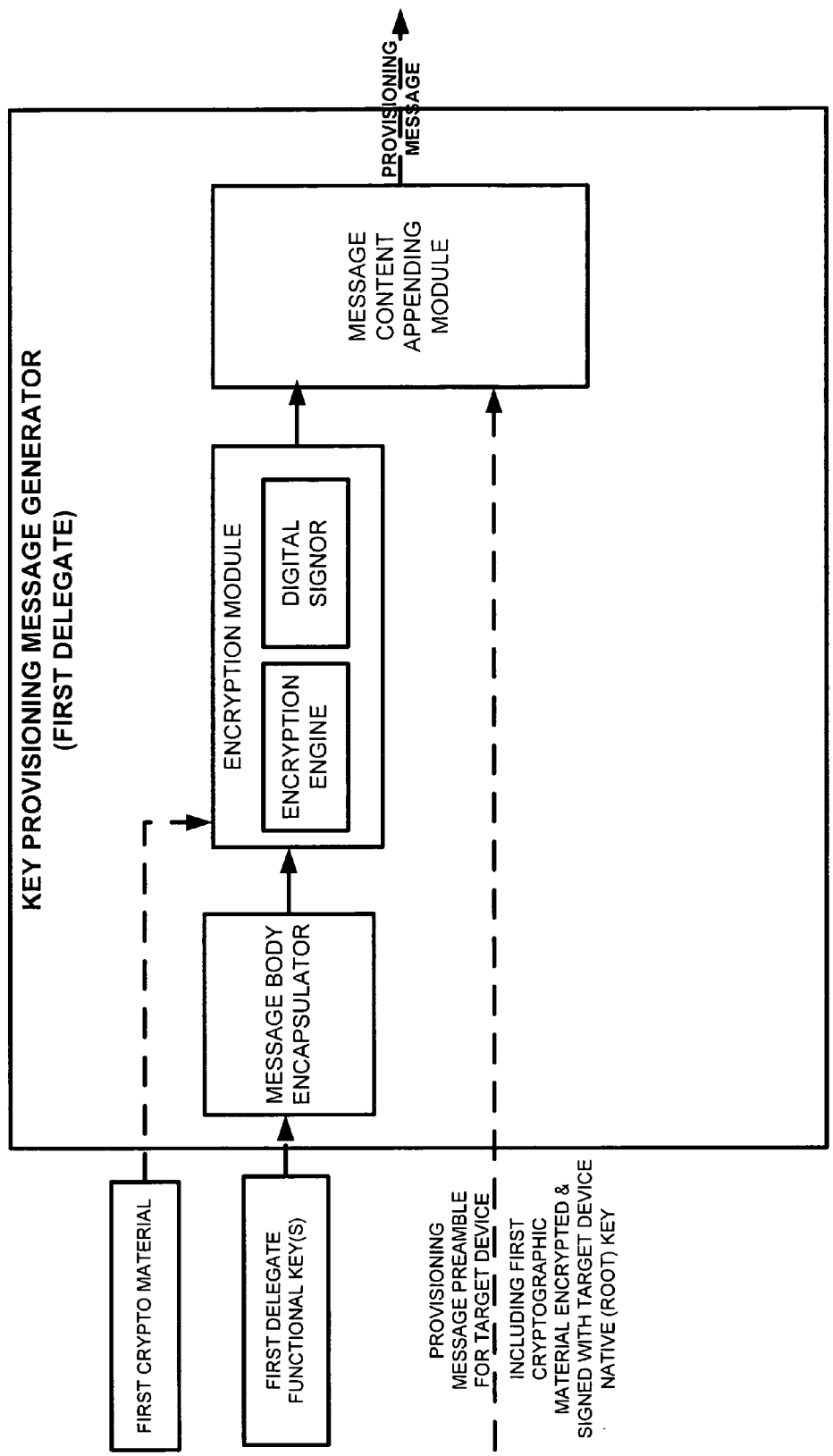
FIG. 2 is a functional block diagram of a provisioning message generator used by a first delegate according to embodiments of the present invention.
Figure 3:
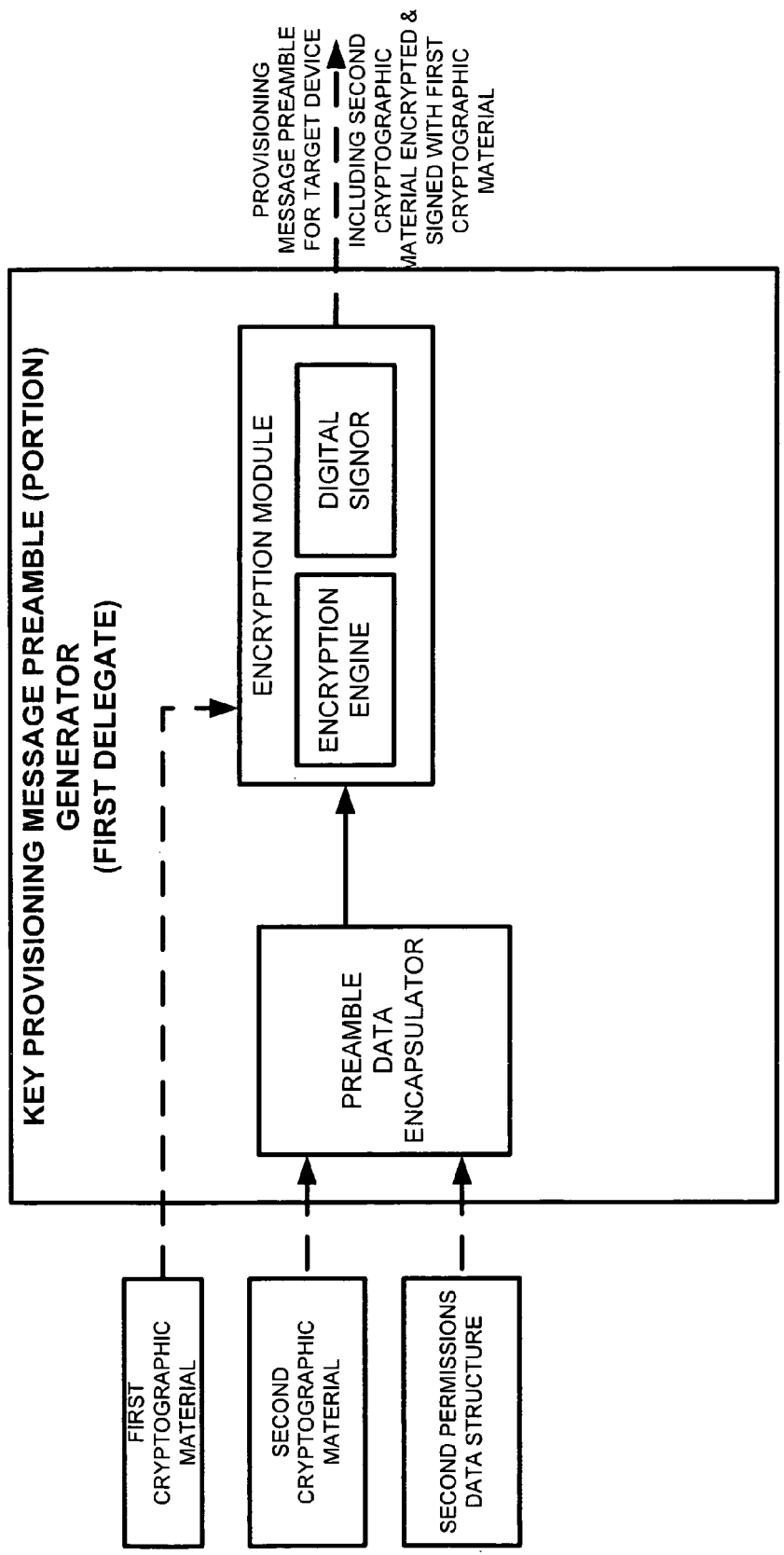
FIG. 3 is a functional block diagram of a provisioning message preamble generator used by a first delegate to generate a message second portion to a preamble useable by a second delegate in accordance with embodiments of the present invention.
Figure 4:
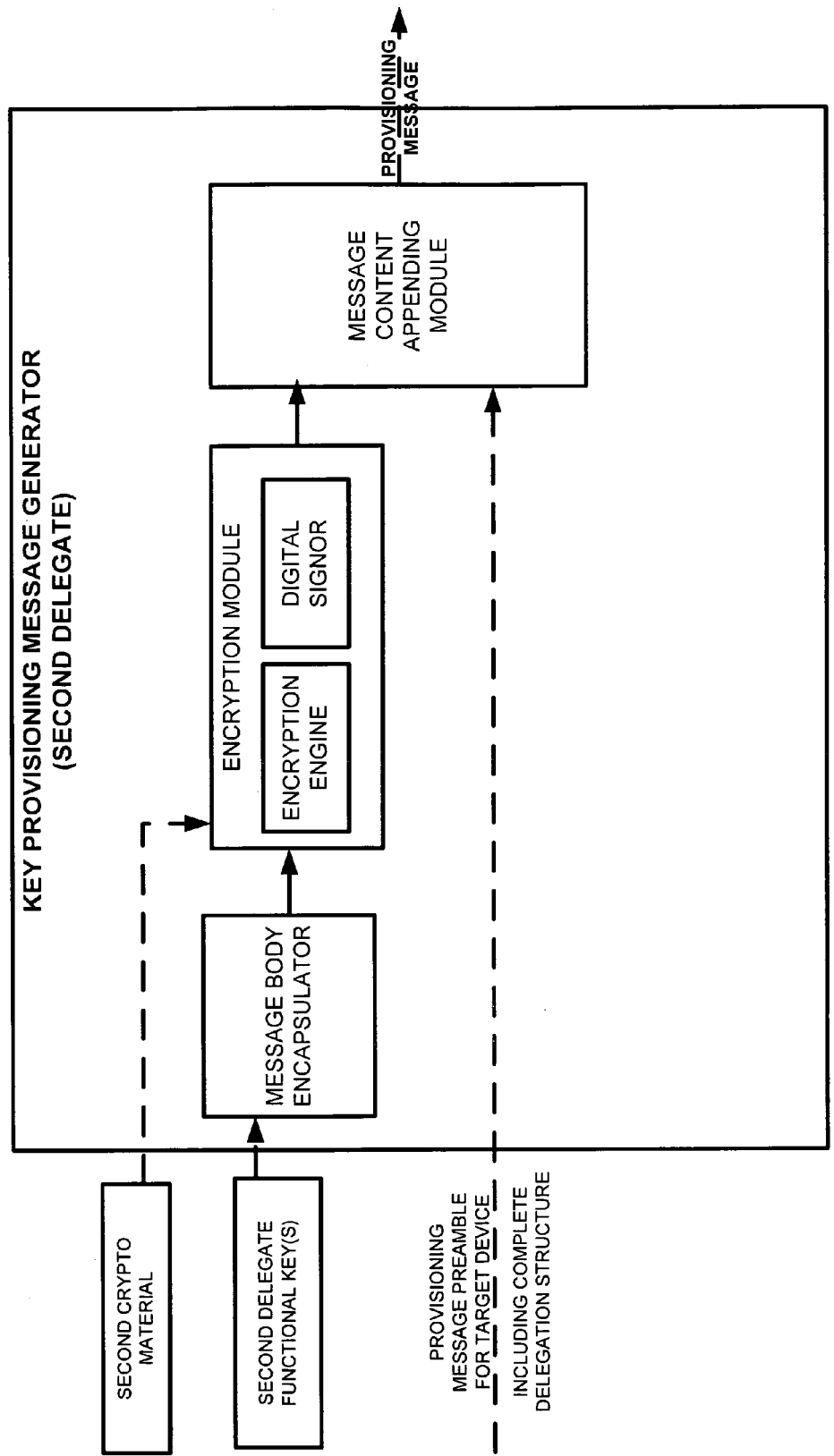
FIG. 4 is a functional block diagram of a provisioning message generator used by a second delegate according to embodiments of the present invention.
Figure 5:
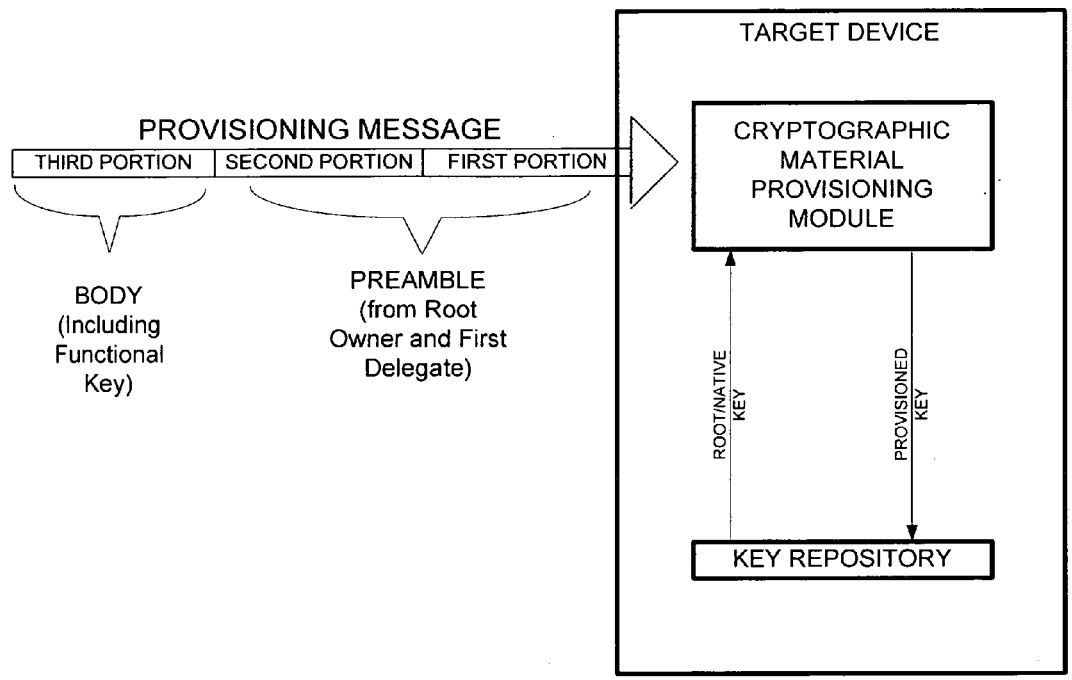
FIG. 5 is a functional block diagram of a target device including a cryptographic material provisioning module receiving a provisioning message in accordance to some embodiments of the present invention.

Turning now to FIG. 1, there is shown a functional block diagram of a provisioning message preamble generator used by a target device root owner according to embodiments of the present invention. FIG. 2 is a functional block diagram of a provisioning message generator used by a first delegate according to embodiments of the present invention. FIG. 3 is a functional block diagram of a provisioning message preamble generator used by a first delegate to generate a message second portion to a preamble useable by a second delegate in accordance with embodiments of the present invention. FIG. 4 is a functional block diagram of a provisioning message generator used by a second delegate according to embodiments of the present invention. And FIG. 5 is a functional block diagram of a target device including a cryptographic material provisioning module receiving a provisioning message in accordance to some embodiments of the present invention.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An electronic device comprising:
   a cryptographic material provisioning (CMP) module to perform a method comprising:
   (a) receiving a CMP message which comprises a preamble and a payload;
   (b) decrypting the preamble of the CMP message by using a root key of the electronic device;
   (c) extracting from the decrypted preamble of the CMP message a first cryptographic key;
   (d) extracting from the decrypted preamble of the CMP message a primary permissions data vector indicating at least one of: (A) a type of keys that are authorized to be provisioned to the electronic device by a user of the preamble, and (B) an indication of whether or not the user of the preamble is authorized to delegate key provisioning rights to other entities;
   (e) decrypting at least a portion of the payload of the CMP message by using the first cryptographic key that was extracted from the preamble;
   (f) extracting a functional cryptographic key from the decrypted payload of the CMP message, wherein the extracted functional cryptographic key comprises a cryptographic key associated with at least one of: an application installed on the electronic device, and a process running on the electronic device;
   (g) checking key metadata, of the extracted functional cryptographic key, against one or more usage permissions indicated by the primary permissions data vector, and determining whether or not the extracted functional cryptographic key is of a type permitted for provisioning;
   (h) if it is determined that the extracted functional cryptographic key is of a type permitted for provisioning by the permissions data vector, then provisioning the extracted functional cryptographic key to said electronic device, wherein the provisioning comprises at least one of: (x) storing the extracted functional cryptographic key in the electronic device, (y) using the extracted functional cryptographic key in the electronic device, (z) installing the extracted functional cryptographic key in the electronic device,
   wherein the CMP message comprises a multi-level delegation hierarchy for provisioning one or more cryptographic keys for use by one or more applications of the electronic device;
   wherein the root key of the electronic device is used to delegate at least partial key provisioning rights to one or more other parties;
   wherein at least one of said other parties is authorized, based on a respective permissions data vector, to delegate at least part of the key provisioning rights to one or more other parties,
   wherein the electronic device is implemented by utilizing at least a hardware component.

2. The electronic device according to claim 1, wherein some or all of the preamble is digitally signed using the root key of the electronic device.

3. The electronic device according to claim 1, wherein said extracted functional cryptographic key is utilized by the electronic device for a process selected from the group consisting of (1) decrypting data, (2) encrypting data, (3) digital rights management, (4) signature generation, (5) signature generation verification, and (6) payment application.

4. The electronic device according to claim 1, wherein said CMP module is to regulate usage of the extracted functional cryptographic key by an application of the electronic device in accordance with usage permissions indicated by key metadata and by the primary permissions data vector.

5. The electronic device according to claim 1, wherein the method comprises:
   extracting from the decrypted payload of the CMP message a second cryptographic key usable for decrypting another portion of the CMP message.

6. The electronic device according to claim 5, wherein the decrypted payload of the CMP message further comprises a second permissions data vector, and wherein said CMP module is to regulate usage of said second cryptographic key in accordance with usage limitations of both the first and second permissions data vectors.

7. The electronic device according to claim 6, wherein said CMP module is to process a portion of the CMP message using the second cryptographic key.

8. The electronic device according to claim 7, wherein said CMP module is to regulate usage of the extracted functional cryptographic key, extracted from said CMP message, in accordance with all usage limitations of all permissions data vectors within the CMP message.

9. The electronic device according to claim 1, wherein the primary permissions data vector defines one or more types of functional cryptographic key which may be included in the CMP message.

10. The electronic device according to claim 9, wherein said CMP module is not to process cryptographic material in the CMP message associated with functional keys of a type that is different from types defined in the primary permissions data vector.

11. The electronic device of claim 1, wherein extracting the functional cryptographic key from the decrypted payload of the CMP message comprises:
(A) determining that the decrypted payload comprises a secondary permissions data vector and a second cryptographic key;
(B) extracting from the decrypted payload said secondary permissions data vector and said second cryptographic key;
(C) regulating usage of the extracted functional cryptographic key in accordance with usage limitations of both the primary permissions data vector and the secondary permissions data vector.

12. The electronic device of claim 1, wherein the CMP message comprises a two-part preamble and a payload portion;
wherein the two-part preamble comprises:
(A) a first preamble portion which stores (i) a first cryptographic key, encrypted by using the root key of the electronic device; and (ii) a first permissions vector associated with the first cryptographic key, wherein the first permissions vector defines provisioning limitations associated with the first cryptographic key; and
(B) a second preamble portion which stores (iii) a second cryptographic key, encrypted by using the first cryptographic key; and (iv) a second permissions vector associated with the second cryptographic key, wherein the second permissions vector defines provisioning limitations associated with the second cryptographic key;
wherein the payload portion comprises: (v) said functional cryptographic key, encrypted by using the second cryptographic key;
wherein provisioning of the functional cryptographic key is regulated by provisioning limitations which correspond to an aggregation of the provisioning limitations of the first and second permission vectors.

13. The electronic device of claim 1, wherein the multi-level delegation hierarchy has a non-predefined length.

14. The electronic device of claim 1, wherein the CMP message comprises data for partial delegation functionality based on key types; wherein a member in a provisioning rights delegation hierarchy is authorized, by a respective permissions vector, to define which delegated key provisioning rights its delegates receive by delegation.

15. The electronic device of claim 14, wherein the CMP message comprises data indicating that delegated key provisioning rights do not exceed key provisioning rights of a member higher in the a multi-level delegation hierarchy.

16. The electronic device of claim 1, wherein the preamble of the CMP message is generated for a specific target device and is provided to a party intending to utilize the functional cryptographic key on said target device.

17. The electronic device of claim 1, wherein the preamble of the CMP message
(A) is generated for a specific group of multiple target devices, and
(B) is provided to a party intending to utilize the functional cryptographic key on said target device.

18. The electronic device of claim 17, wherein the specific group of multiple target devices comprises at least one of:
a group of multiple electronic devices that have a common maker;
a group of multiple electronic devices that have a common model.

19. A method of cryptographic material provisioning (CMP), the method being implementable on an electronic device which comprises at least a hardware component, the method comprising:
(a) receiving a CMP message which comprises a preamble and a payload;
(b) decrypting the preamble of the CMP message by using a root key of the electronic device;
(c) extracting from the decrypted preamble of the CMP message a first cryptographic key;
(d) extracting from the decrypted preamble of the CMP message a primary permissions data vector indicating at least one of: (A) a type of keys that are authorized to be provisioned to the electronic device by a user of the preamble, and (B) an indication of whether or not the user of the preamble is authorized to delegate key provisioning rights to other entities;
(e) decrypting at least a portion of the payload of the CMP message by using the first cryptographic key that was extracted from the preamble;
(f) extracting a functional cryptographic key from the decrypted payload of the CMP message, wherein the extracted functional cryptographic key comprises a cryptographic key associated with at least one of: an application installed on the electronic device, and a process running on the electronic device;
(g) checking the extracted functional cryptographic key against one or more usage permissions indicated by the primary permissions data vector, and determining whether or not the extracted functional cryptographic key is of a type permitted for provisioning;
(h) if it is determined that the extracted functional cryptographic key is of a type permitted for provisioning by the permissions data vector, then provisioning the extracted functional cryptographic key to said electronic device, wherein the provisioning comprises at least one of: (x) storing the extracted functional cryptographic key in the electronic device, (y) using the extracted functional cryptographic key in the electronic device, (z) installing the extracted functional cryptographic key in the electronic device;
wherein the method is implemented by an electronic device comprising at least a hardware component,
wherein the CMP message comprises a multi-level delegation hierarchy for provisioning one or more cryptographic keys for use by one or more applications of the electronic device;
wherein the root key of the electronic device is used to delegate at least partial key provisioning rights to one or more other parties;
wherein at least one of said other parties is authorized, based on a respective permissions data vector, to delegate at least part of the key provisioning rights to one or more other parties.

* * * * *